(12) United States Patent
Henderson

(10) Patent No.: US 6,244,612 B1
(45) Date of Patent: Jun. 12, 2001

(54) STABILIZING DEVICE FOR SINGLE AND DOUBLE WHEEL CYCLES

(76) Inventor: Alexander Blake Henderson, 2011 Pine Forest Ct., Jonesboro, GA (US) 30236

( * ) Notice: Subject to any disclaimer, the term of this patent is extended or adjusted under 35 U.S.C. 154(b) by 0 days.

(21) Appl. No.: 08/988,274

(22) Filed: Dec. 10, 1997

(51) Int. Cl.[7] .................................................. B62H 7/00
(52) U.S. Cl. ................................... 280/293; 280/301
(58) Field of Search ................................. 280/293, 298, 280/301, 304, 755, 47.371, 304.5, 288.4, 62; 294/19.1; 16/110 R, 111 R, 112, 114 R; 254/35, 36; 74/543, 544; 434/247

(56) References Cited

U.S. PATENT DOCUMENTS

| | | |
|---|---|---|
| 3,485,507 | 12/1969 | Christof . |
| 3,650,544 | * 3/1972 | Cassell ................................. 280/293 |
| 4,659,124 | * 4/1987 | Hillman ............................... 294/19.1 |
| 4,903,975 | 2/1990 | Weisbrodt et al. . |
| 4,917,398 | * 4/1990 | De Miranda Pinto ............... 280/293 |
| 5,154,096 | 10/1992 | Geller et al. . |
| 5,217,240 | 6/1993 | Gardenhour, Jr. et al. . |
| 5,303,944 | 4/1994 | Kalmus . |
| 5,306,030 | 4/1994 | Becka . |
| 5,395,130 | 3/1995 | Rubin . |
| 5,407,222 | 4/1995 | Harrison . |
| 5,487,554 | 1/1996 | May . |
| 5,580,069 | * 12/1996 | Trejo et al. ........................ 280/305.5 |

* cited by examiner

*Primary Examiner*—Anne Marie Boehler
(74) *Attorney, Agent, or Firm*—Jones & Askew, LLP

(57) ABSTRACT

The present invention reveals a device that enables an instructor to stabilize a moving single or double wheel cycle and rider as the instructor assists the new rider to safely develop the balancing and steering skills necessary to control the cycle independently. To accomplish its purpose, the device comprises: a pivotal connector mounted to the cycle; a handle that provides a gripping location for the instructor; and an extension which joins the connector to the handle. The pivotally mounted connector permits the handle to be swung laterally in an arc from a position of minimal control behind the rider, to an position of maximum control immediately adjacent to the rider. The amount of leverage and control the instructor desires to exert over the moving cycle and rider is determined by where in relation to the rider the instructor chooses to position the handle.

13 Claims, 2 Drawing Sheets

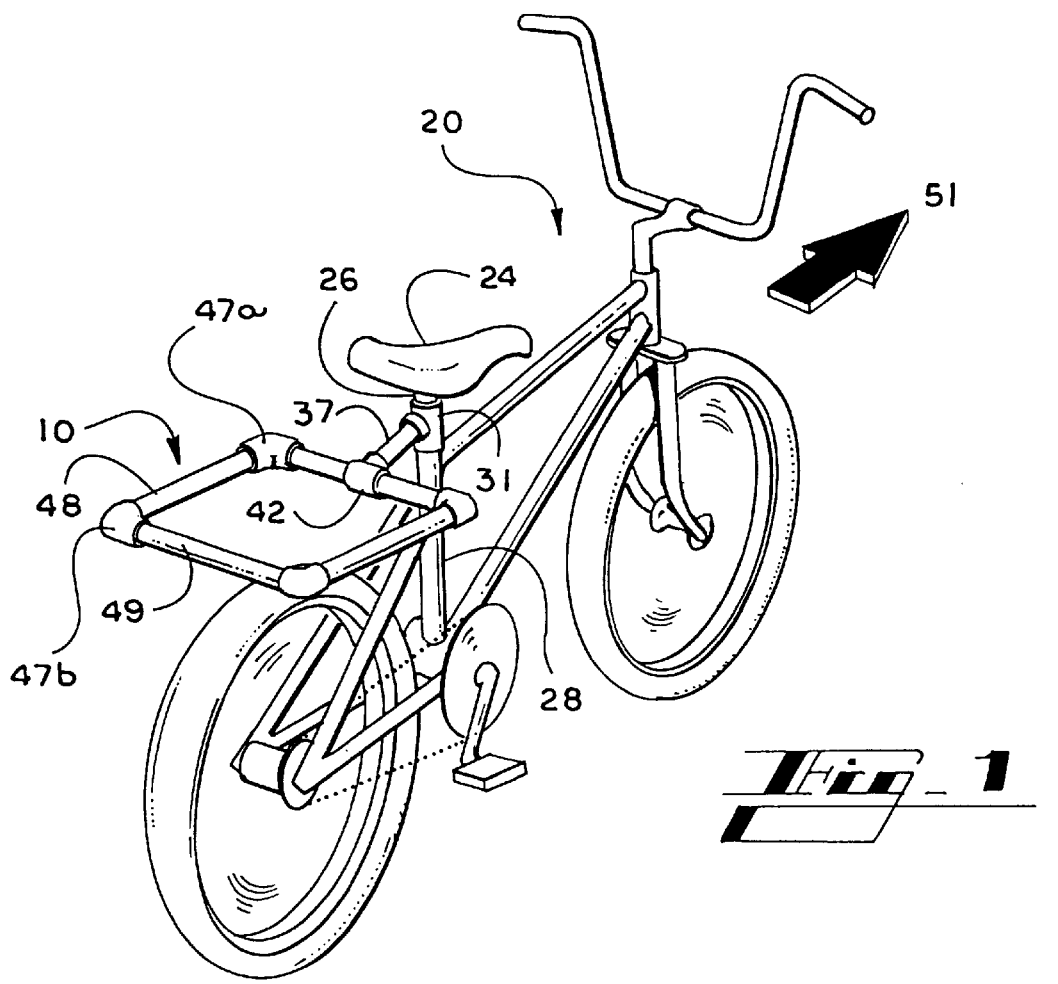
Fig_1
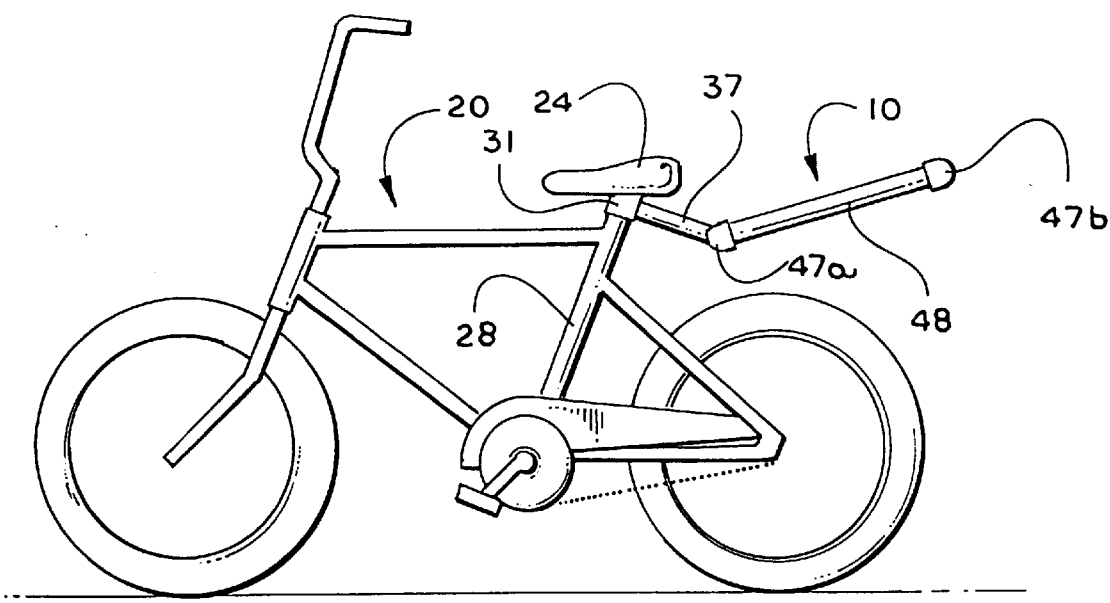
Fig_2

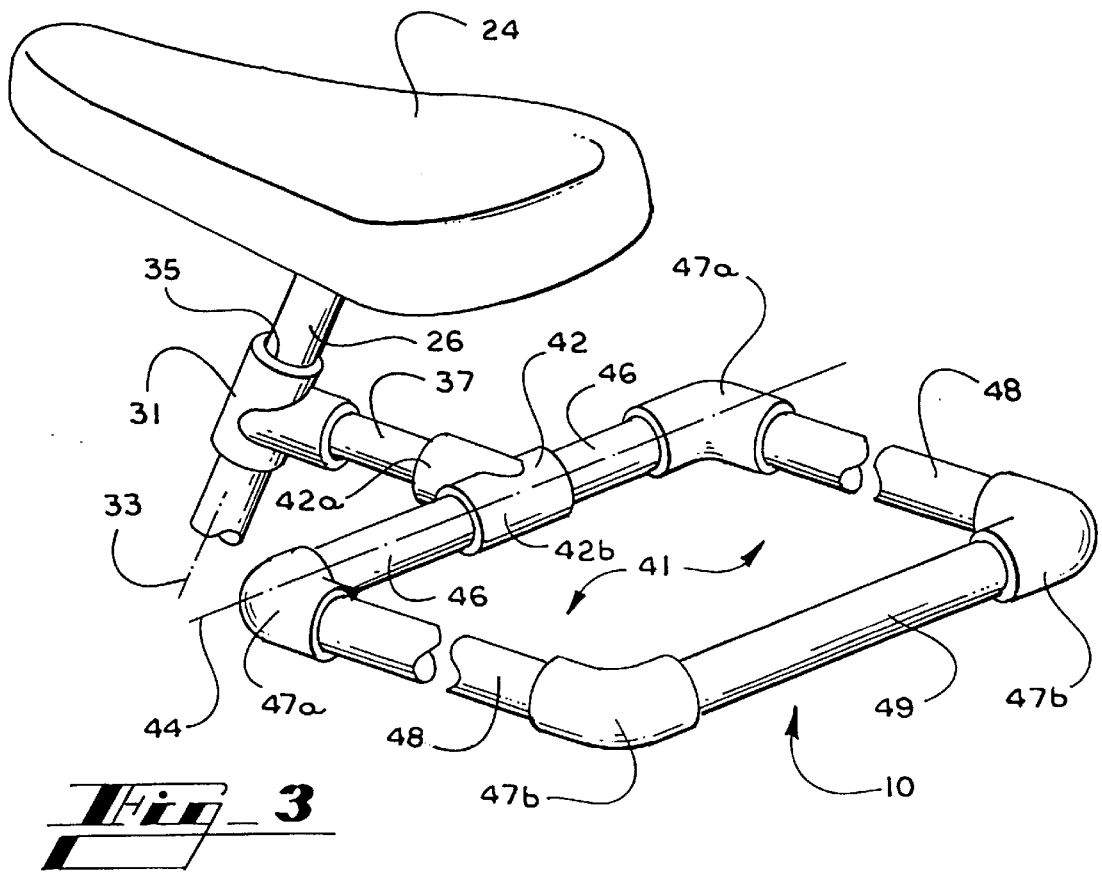
Fig_3
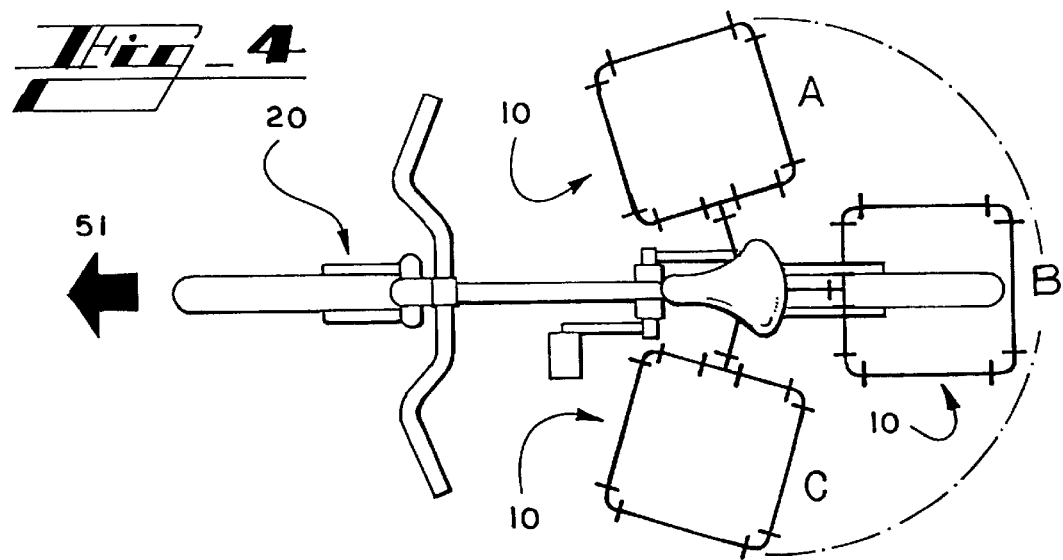
Fig_4

STABILIZING DEVICE FOR SINGLE AND DOUBLE WHEEL CYCLES

TECHNICAL FIELD

The present invention enables an instructor to stabilize a moving single or double wheel cycle and rider as the instructor assists the new rider to safely develop the balancing and steering skills necessary to control the cycle independently. More particularly, this stabilizing device is pivotally mounted to the cycle, thereby permitting the instructor to alter position with respect to the direction of travel in order to achieve the maximum leverage necessary to stabilize the moving cycle and rider.

BACKGROUND OF THE INVENTION

Young children typically learn to ride a bicycle with the assistance of an older family member, and unicycle riders are substantially self-taught older children and young adults. In either situation, the process of developing the balancing skills related to riding is inherently accompanied by falls where both the rider and cycle often sustain injury.

The beginning bicyclist is normally aided by an instructor who assists in stabilizing the moving cycle and rider in an effort to abate the inevitable falls. More disadvantaged is the beginning unicyclist who is normally aided only by balancing poles, much like a skier is aided by ski poles. Paradoxically, the unicyclist's balancing poles are really only suited for the rider with sufficient skill to stay substantially upright. As the problems inherent in learning to ride are as old as the cycles themselves, devices have been introduced to assist both rider and instructor. For example, it is known that cycles with more than two wheels are inherently stable, thereby eliminating the need for additional assistance. Likewise, training wheels provide increased lateral stability. In addition, it is known to rigidly fix handles of various configurations to the rear of the bicycle so that, while the instructor is forced to remain behind the bicycle, they can provide some assistance in propelling, steering, and sometimes balancing the beginning rider. However, those devices developed for use with an instructor uniformly require the instructor to remain well behind the bicycle —the very location that provides the instructor the least ability to stabilize the moving cycle.

U.S. Pat. No. 3,485,507 (Christof) discloses a rectangular-shaped handle as part of a steering mechanism, attached to a front wheel, that is ultimately operated by a person walking behind a tricycle. While the Christof device is applicable to tricycle riders who may require assistance in steering or propelling the tricycle, it is not relevant to stability or balance as tricycles are inherently stable.

The pushing device disclosed in U.S. Pat. No. 5,154,096 (Gardenhour, Jr. et al.) consists of a stick like device with one end attached to a "C" shaped hook and the other end attached to an oval-shaped handle. With the stick hooked to a tricycle, a person can assist in propelling the tricycle in the desired direction of travel by pushing or pulling the handle. Although the Gardenhour device loosely fits the tricycle, the purpose of the loose fit is to facilitate attachment and removal. Gardenhour only teaches of using the device behind the tricycle and in the direction of intended travel; it does not teach of using the device to assist in stabilizing single or double wheeled cycles. Like the Christof device, the Gardenhour invention is directed only to tricycles which are inherently stable.

Similarly, U.S. Pat. No. 5,303,944 (Kalmus) teaches that a stick-like steering device can be rigidly clamped to a bicycle seat post. More particularly, the Kalmus patent appears directed to a device that offers flexibility in adjusting the length and angle of the stick while providing for a means of easy detachment. With the stick in place, an instructor can offer some balancing assistance to the beginning rider by pushing or pulling on the steering device. However, the placement of the stick relegates the instructor to a position well behind the cycle—a position that prohibits the instructor from offering more than a small amount of leverage to stabilize the cycle, and places the instructor out of reach of a falling rider.

U.S. Pat. No. 5,487,554 (May) describes a bicycle training handle rigidly affixed and extending upwardly and rearwardly from the rear of the bicycle. With a broad handle and three point attachment to the bicycle frame, this training device seeks to provide "a very rigid framework" by which a helper can better assist in averting falls. Like other devices, the May invention is rigidly fixed and provides the instructor little leverage in balancing the moving cycle and rider.

The primary thrusts of the prior art are directed to propelling inherently stable tricycles, or steering and balancing bicycles with rigidly fixed attachments. While the latter devices are capable of offering some assistance to the beginning rider, they relegate the instructor to a position well behind the bicycle. Forcing the instructor behind the cycle as required by the prior art, removes the instructor far from the preferred position of maximum leverage and maximum control; that is, immediately perpendicular to the rider, and places the instructor beyond the reach of a falling rider.

Thus, the existing devices describe attachments which extend outwardly behind the tricycle or bicycle for the purpose of allowing an instructor to aid the rider propel or steer. Accordingly, there has long existed a need in the art for a device that provides substantial leverage to stabilize the cycle; that positions the instructor within easy grasp of the rider; and permits the instructor to adjust control of the cycle in relation to the experience level of the rider.

SUMMARY OF THE INVENTION

The present invention seeks to cure the problems inherent in learning to ride a cycle, and bridge those gaps left by prior art inadequacies by providing a device that: places the instructor perpendicular to the rider to create maximum leverage and stability over the moving cycle, permits the instructor to adjust the level of control in response to the experience level of the rider, and places the instructor within easy grasp of a falling rider.

In accordance with the invention, these objectives are accomplished by providing a device that can be pivoted to a position immediately adjacent to the rider, comprising; a pivotal connector mounted to the cycle; a handle that provides a gripping location for the instructor; and an extension which joins the connector to the handle. As used herein, the term pivotal connector is intended to refer to any interconnection between the cycle and the handle that allows an instructor to move the handle into different orientations relative to the cycle, while being able to exert force on the cycle via the handle at each orientation. The pivotally mounted connector permits the handle to be swung laterally in an arc from a "neutral" position behind the rider and parallel to the direction of travel, to an "extreme" position immediately adjacent to the rider and perpendicular to the direction of travel. In the preferred embodiment, the ability to pivot the handle about the cycle is created by slideably mounting a sleeve, connected to the handle, about the substantially vertical axis formed by the seat post of the cycle.

With the stabilizing device substantially perpendicular to the direction of travel, the instructor can exert maximum leverage over the moving cycle. At these positions of maximum leverage, the instructor creates maximum stability and control over the moving cycle and rider. These extreme positions are preferred for a beginning or unbalanced rider. As the stabilizing device is moved from an extreme position toward the neutral position, the instructor increasingly relinquishes leverage and control over the cycle's stability. At the neutral position; that is, substantially parallel to the direction of travel, the instructor is able to exert only minimum leverage and control over the moving cycle and rider. This is the preferred position for the stronger or more balanced beginning rider, or for the rider that does not require the assistance of an instructor.

A stabilizing device embodying the present invention, and specifically a pivotally mounted connector attached to the cycle and free to rotate, permits the instructor to place him or herself in a position that provides maximum leverage; permits the instructor to adjust the level of control in relation to the experience level of the rider; places the instructor within easy grasp of a falling rider; and, is easy to connect and disconnect. In alternative embodiments, the pivotally mounted connector could be attached to a temporary member of the cycle, the extension may be eliminated and the handle attached directly to the connector, and the handle may be formed in any number of different shapes, including but not limited to rectangular, triangular, circular, oval, or nothing more elaborate than a short shaft formed by simply elongating the extension fixed to the pivotally mounted connector.

Thus, it is the object of the present invention to provide substantial leverage to stabilize a moving single or double wheel cycle and rider.

It is a further object of the present invention to provide an apparatus that permits the instructor to adjust control of the cycle in relation to the experience level of the rider.

It is a further object of the present invention to provide an apparatus that moves the instructor from behind the cycle and places them within easy grasp of a falling rider.

Other objects, features and advantages of the present invention will become apparent upon review of the following detailed description of preferred embodiments of the invention when taken in conjunction with the drawings.

BRIEF DESCRIPTION OF THE DRAWINGS

FIG. 1 is a rear perspective view of a bicycle with the balancing device attached and in the neutral position.

FIG. 2 is a side diagrammatic view of a bicycle with the balancing device attached and in the neutral position.

FIG. 3 is a perspective view of the balancing device attached to the seat support of either a single or double wheeled cycle.

FIG. 4 is a top diagrammatic view that depicts the extreme range of positions in which the balancing device can be placed when attached to a bicycle.

DETAILED DESCRIPTION OF THE DISCLOSED EMBODIMENT

Referring now in more detail to the drawings, in which like numerals refer to like parts throughout the several views, FIGS. 1 and 2 show a stabilizing device 10 mounted on an existing two wheel cycle 20. The stabilizing device 10 may be mounted on a single double wheel cycle of any size or design. However, for the purpose of disclosing the present invention, the exemplary cycle chosen is a common bicycle that includes a seat 24 mounted on an adjustable seat support post 26 that is housed and held in place by a hollow frame member 28.

Referring now to FIG. 3, the stabilizing device 10 includes a pivotally mounted connector 31 which, in the preferred embodiment, is a tube circumscribing the seat post 26. To mount the balancing device to the cycle 20, the seat 24 is removed, the connector 31 is slipped over the seat post 26, and said seat 24 is replaced. Since the inside diameter of the connector 31 is slightly greater than the outside diameter of the seat support 26, the connector 31 does not bind but freely rotates about the substantially vertical axis 33 created by the seat support 26. Smaller seat posts 26 may be accommodated by including an insert 35 within the connector 31.

Because there can be relative movement between the outside wall of the seat post 26 and the inside wall of the connector 31, the stabilizing device 10 can be placed quickly in a broad range of positions. For example, FIG. 1 and FIG. 2 show the balancing device 10 immediately behind and essentially parallel with the bicycle frame in a "neutral" position "B". FIG. 4 shows the balancing device to either side of the rider in "extreme" positions "A" and "C", which are at least 90° from the neutral position. The significance and novelty of varying the stabilizing device 10 placement is discussed in detail below.

Referring again to FIG. 3, the connector 31 is rigidly attached to an extension 37. Extension 37 protrudes from the connector 31 for a short distance where it is connected to handle 41 at a pivot connector 42. The pivot 42 is a "T" shaped connector providing a receiving end 42a in the stem of the "T" for attachment to the extension 37. The top of the "T" is formed by a tubular fitting 42b, which frictionally receives a cross bar 46 of the handle 41, which is able to rotate within the fitting 42b about a horizontal axis 44. This frictional fit joint permits the handle 41 to maintain its orientation after rotation. Alternatively, the frictional fit can be exchanged for a loose fit within the fitting 42b and a means of locking or securing the cross bar 46 in the desired orientation.

The cross bar 46 extends equally in opposite directions for a short distance and ends with a rigid connection to a pair of right angled connectors 47a. The right angled connectors 47a are also rigidly fixed to a pair of side grip bars 48. The parallel side grips 48 extend a short distance from the connectors 47a to another pair of right angled connectors 47b, where each side bar is inserted and rigidly fixed. A cross grip 49 is inserted into and rigidly fixed between the right angled connector 47b. Thus, the bars 46, 48 and 49 form the rectangular handle 41. As the cross grip 49 is the primary gripping member, the other structure of the rectangle and the extension 37 may be considered as a body portion extending from the connector 31 to the grip 49.

The pivotally mounted connector 31 as well as all other elements of the stabilizing device 10 are made of lightweight high strength materials, such as PVC tubing, any strong tubular or solid plastic members, wood, or metal. A bearing can be provided in the connect or 31, but generally will not be required. It will be appreciated that the connector, body, and handle portion can be integrally formed.

Turning now to operation of the stabilizing device 10, an instructor may vary the placement of the stabilizing device 10 by way of the pivotally mounted connector 31. FIG. 4 reveals the range of positions available to an instructor. Between position "A" and "C", the balance device can be placed anywhere in an arc of over 180° With the stabilizing device 10 in either position "A" or "C"; that is, substantially perpendicular to the direction of travel 51, the instructor can exert maximum leverage over the cycle 20 if it begins to fall. At these positions of maximum leverage, the instructor creates maximum stability which translates into maximum control over the moving cycle and rider. These are the preferred positions for a beginning and unbalanced rider. As the stabilizing device 10 is moved from an extreme "A" or "C" position toward the neutral "B" position, the instructor increasingly relinquishes leverage and therefore control over the cycle's stability. At the neutral "B" position; that is, substantially parallel to the direction of travel 51, the instructor is able to exert only minimum leverage and therefore maintains little control over the moving cycle and rider. This is the preferred position for the stronger and more balanced beginning rider or for the rider that does not require the assistance of an instructor.

From the foregoing description, it is seen that a stabilizing device embodying the present invention, and specifically the novelty of a pivotally mounted connector attached to the cycle and free to rotate, permits the instructor to place him or herself in a position which provides maximum leverage; permits the instructor to adjust the level of control in relation to the experience level of the rider; and places the instructor within easy grasp of a falling rider. Furthermore, the device is easy to connect and disconnect by removing the seat 24 in the normal manner.

While the present invention has been described in its various aspects and in detail with regard to the preferred embodiment, it should be understood that variations, modifications and enchantments can be made to the disclosed apparatus without departing from the spirit and scope of the present invention defined in the appended claims. For example, the pivotally mounted connector could be attached to a permanent or temporary member of the cycle; the device could include a locking feature to set the desired angle with relation to the rider; the extension could be eliminated by attaching the handle directly to the pivot connector; or, the rectangular handle may be exchanged for any number of different shapes, including a short linear shaft, a triangle, a circle, or oval handle.

What is claimed is:

1. In combination, a single or two wheel cycle and a stabilizing device therefor, comprising:
    a connector freely pivotally mounted to a seat post of said cycle;
    a rectangular handle portion, said handle portion comprising a cross bar; a pair of elongate side grip bars attached to opposite ends of said cross bar; and a cross grip extending between outward ends of said side grip bars; and
    a body portion extending from said connector to said handle portion;
    said connector being mounted at a position in which stabilizing force can be applied to said seat post while allowing a person grasping said handle portion to move said handle portion from a position behind said cycle toward a position alongside said cycle.

2. The apparatus of claim 1, wherein said pivotal connector is slidably mounted over said seat post of said cycle.

3. The apparatus of claim 2, wherein said pivotal connector comprises an insert of sufficient thickness to substantially fill any gap between the inside wall of the connector and the outside wall of the seat post without preventing freedom of rotation.

4. The apparatus of claim 1, wherein said handle portion provides a gripping surface.

5. The apparatus of claim 4, further comprising a horizontal pivot that permits the handle portion to be adjusted vertically relative to the connector mounted to the cycle.

6. The apparatus of claim 1, wherein the pivotally mounted connector, body portion, and handle portion are an integrally formed, freely-rotating unit.

7. The apparatus of claim 6, wherein said pivotal connector is slidably mounted over said seat post of said cycle.

8. The apparatus of claim 6, wherein said handle portion provides a gripping surface.

9. A method of stabilizing a single or double wheel cycle, comprising the steps of:
    a) attaching to said cycle a stabilizing device comprising:
        a rectangular handle portion, said handle comprising a cross bar; a pair of elongate side grip bars attached to opposite ends of said cross bar; and a cross grip extending between outward ends of said side grip bars; and
        a body portion extending from said handle portion to a distal end and being freely pivotally connected to a seat post of said cycle at said distal end;
    b) placing said cycle into motion;
    c) positioning said device within a range permitted by said pivotal connection at said distal end, to vary the leverage a user can apply to stabilize said cycle while using the device to apply;
    a stabilizing force to said seat post.

10. The method of claim 9, wherein said distal end defines a connector pivotally mounted to said cycle.

11. The method of claim 9, wherein said distal end is pivotally connected to a connector attached to said cycle.

12. The method of claim 9, wherein said positioning step comprises moving said device to any position within an arc defined as beginning at an angle substantially perpendicular to the right side of said cycle, continuing at least behind and around said cycle approximately 180°, and ending at an angle substantially perpendicular to the left side of said cycle.

13. A stabilizing device connected to a seat post of a single or double wheel cycle, comprising:
    a freely pivotally mounted sleeve circumscribing said seat post;
    a body portion extending outwardly from said sleeve;
    a rectangular handle connected to said body portion, said handle comprising a cross bar; a pair of elongate side grip bars attached to opposite ends of said cross bar; and a cross grip extending between outward ends of said side grip bars;
    whereby a person grasping said handle can orient said stabilizing device from a position behind said cycle toward a position alongside said cycle while applying a stabilizing force to said seat post.

* * * * *